(12) United States Patent
Farmer et al.

(10) Patent No.: US 9,770,876 B2
(45) Date of Patent: Sep. 26, 2017

(54) METHOD OF MANUFACTURING AN OBJECT

(71) Applicant: AIRBUS GROUP LIMITED, London (GB)

(72) Inventors: Benjamin Farmer, Bristol (GB); Jonathan Meyer, Miltshire (GB)

(73) Assignee: AIRBUS GROUP LIMITED, London (GB)

(*) Notice: Subject to any disclaimer, the term of this patent is extended or adjusted under 35 U.S.C. 154(b) by 933 days.

(21) Appl. No.: 13/922,019

(22) Filed: Jun. 19, 2013

(65) Prior Publication Data

US 2013/0337256 A1 Dec. 19, 2013

(30) Foreign Application Priority Data

Jun. 19, 2012 (GB) .................................. 1210851.0

(51) Int. Cl.
*H01L 41/257* (2013.01)
*H01L 41/45* (2013.01)
(Continued)

(52) U.S. Cl.
CPC ...... *B29D 99/0078* (2013.01); *B29C 47/0002* (2013.01); *B29C 47/0004* (2013.01);
(Continued)

(58) Field of Classification Search
CPC ............ B29C 47/0076; B29C 47/0866; B29C 47/0872; B29C 47/862; B29C 67/0055; B29C 70/16; H01L 41/257; H01L 41/45
(Continued)

(56) References Cited

U.S. PATENT DOCUMENTS 4,680,156 A 7/1987 Collier
5,811,186 A * 9/1998 Martin ................. B24D 11/005
428/373
(Continued)

FOREIGN PATENT DOCUMENTS

EP 0340982 A2 11/1989
GB 1095735 A 12/1967
WO 2012037329 A2 3/2012

OTHER PUBLICATIONS

Communication in EP Appln. No. 13171988.2 dated Oct. 2, 2013.

*Primary Examiner* — Leo B Tentoni
(74) *Attorney, Agent, or Firm* — Hauptman Ham LLP (57) ABSTRACT

In a method of manufacturing an object, a filament is fed to an extrusion head. The filament has a semi-crystalline polymeric reinforcement portion and a polymeric matrix portion. The temperature of the filament is raised in the extrusion head above the melting point of the matrix portion but below the melting point of the reinforcement portion so that the matrix portion of the filament melts within the extrusion head, thereby forming a partially molten filament within the extrusion head. The reinforcement portion of the partially molten filament remains in a semi-crystalline state as it is extruded from the extrusion head. Relative movement is generated between the extrusion head and the substrate as the partially molten filament is extruded onto the substrate in order to form an extruded line on the substrate. The matrix portion of the extruded line solidifies after the extruded line has been formed on the substrate.

5 Claims, 8 Drawing Sheets (51) Int. Cl.

| | | |
|---|---|---|
| *B29D 99/00* | (2010.01) | |
| *B29C 47/00* | (2006.01) | |
| *B29C 47/02* | (2006.01) | |
| *B29C 47/08* | (2006.01) | |
| *B29C 47/10* | (2006.01) | |
| *B29C 47/86* | (2006.01) | |
| *B29C 47/92* | (2006.01) | |
| *D02G 3/22* | (2006.01) | |
| *B29C 70/52* | (2006.01) | |
| *B29C 70/04* | (2006.01) | |
| *B29C 70/16* | (2006.01) | |
| *B33Y 30/00* | (2015.01) | |
| *B33Y 10/00* | (2015.01) | |
| *B33Y 70/00* | (2015.01) | |
| *B29C 47/06* | (2006.01) | |
| *B29C 47/12* | (2006.01) | |
| *B29C 67/00* | (2017.01) | |

(52) U.S. Cl.
CPC ........ *B29C 47/0076* (2013.01); *B29C 47/026* (2013.01); *B29C 47/0806* (2013.01); *B29C 47/0876* (2013.01); *B29C 47/109* (2013.01); *B29C 47/1045* (2013.01); *B29C 47/1054* (2013.01); *B29C 47/862* (2013.01); *B29C 47/92* (2013.01); *B29C 70/04* (2013.01); *B29C 70/16* (2013.01); *B29C 70/52* (2013.01); *D02G 3/22* (2013.01); *B29C 47/0007* (2013.01); *B29C 47/0014* (2013.01); *B29C 47/0016* (2013.01); *B29C 47/0064* (2013.01); *B29C 47/064* (2013.01); *B29C 47/12* (2013.01); *B29C 67/0055* (2013.01); *B29C 2947/926* (2013.01); *B29C 2947/92704* (2013.01); *B33Y 10/00* (2014.12); *B33Y 30/00* (2014.12); *B33Y 70/00* (2014.12); *Y10T 428/249924* (2015.04); *Y10T 428/2925* (2015.01)

(58) Field of Classification Search
USPC .......................................... 264/255, 308, 435
See application file for complete search history.

(56) References Cited

U.S. PATENT DOCUMENTS

| | | |
|---|---|---|
| 5,936,861 A * | 8/1999 | Jang .................... B29C 70/384 700/98 |
| 6,074,742 A | 6/2000 | Smith et al. |
| 2003/0116747 A1 | 6/2003 | Lem et al. |
| 2003/0236588 A1 | 12/2003 | Jang et al. |
| 2012/0070619 A1 | 3/2012 | Mikulak et al. |
| 2012/0231225 A1 | 9/2012 | Mikulak et al. |

* cited by examiner

METHOD OF MANUFACTURING AN OBJECT

RELATED APPLICATIONS

The present application claims priority from British Application Number 1210851.0, filed Jun. 19, 2012, the disclosure of which is hereby incorporated by reference herein in its entirety.

FIELD OF THE INVENTION

The present invention relates to an extrusion-based additive manufacturing system, an object formed by such a system, a filament for use as consumable feedstock in such a system, and a method of manufacturing of such a filament.

BACKGROUND OF THE INVENTION

An extrusion-based additive manufacturing system is described in WO2012/037329. The system uses a filament as consumable feedstock. The filament has a core portion and a shell portion with different peak crystallization temperatures. Both the core and the shell portions are melted in an extrusion head, and after they have been deposited the portion with the higher crystallization temperature crystallizes before the other portion. This allows the extruded material to resist gravity and the pressure of subsequent layers, while also reducing distortions.

The melting temperatures of the core and shell materials are desirably the same or similar to allow the filament to be readily melted in the extrusion head.

The base polymers for the core and shell are each capable of achieving an average percent crystallinity in a solid state of at least 10% by weight. In one embodiment the base polymers for the core and shell are each capable of achieving an average percent crystallinity in a solid state of at least 25% by weight. In another embodiment the base polymers for the core and shell are each capable of achieving an average percent crystallinity in a solid state of at least 50% by weight. The percent crystallinity of the core and shell materials in the filament is not mentioned either in absolute or relative terms, and is presumably not important since both the core and the shell melt before they are extruded. The shell material exhibits at least about 50% crystallinity after deposition and prior to deposition of a subsequent layer.

In an alternative embodiment a double shell is provided in which the inner shell includes a material that restricts or prevents interdiffusion and/or crystal growth between the materials of the core and outer shell. In this alternative embodiment, suitable materials for the inner shell may include one or more amorphous polymers. The melting temperature of the inner shell is not described.

SUMMARY OF THE INVENTION

The present invention provides a method of manufacturing an object, a filament for use in an extrusion-based additive manufacturing method, a method of manufacturing a filament for use in an extrusion-based additive manufacturing method, apparatus for manufacturing an object by an extrusion-based additive manufacturing method, and an object formed by an extrusion-based additive manufacturing method as set out in the appended claims. Various preferred features are described in the dependent claims.

The present invention provides a reinforcement portion which not only has a higher melting point but also a higher crystallinity than the matrix portion. This can be contrasted with WO2012/037329 which discloses in one embodiment a filament core with a higher melting point than the shell but not a higher crystallinity, and in another embodiment a filament core with a higher crystallinity than an amorphous inner shell but not a higher melting point. By combining high crystallinity with high melting point in the reinforcement portion, the filament can be extruded from the extrusion head without melting the reinforcement portion and destroying its relatively high crystallinity. As a result the reinforcement portion of the filament can retain attractive properties such as high yield strength and/or piezoelectric properties in the final product.

An electromagnetic field may be applied to the filament before it is extruded onto the substrate, thereby poling the reinforcement portion. Such poling can create or enhance piezoelectric properties of the reinforcement portion, particular if it comprises a ferroelectric material or other material which can be poled. The electromagnetic field may be applied to the filament within the extrusion head before and/or after it has been partially melted, or it may be applied before it is fed into the extrusion head. Poling is preferably performed within the extrusion head since this enables the object to be poled non-uniformly by changing the applied field during formation of the part. For instance an extruded line may be selectively poled along only part of its length, and/or the field may be turned off selectively so that some extruded lines are poled and others are not, and/or different parallel extruded lines may be poled in different directions.

The object may be manufactured with a single extruded line only, for instance following a serpentine pattern. However more preferably the object is manufactured with multiple extruded lines. In such a case each line may be cut mechanically with a cutting blade, but more preferably the method further comprises temporarily raising the temperature of the filament in the extrusion head above the melting point of the reinforcement portion after the extruded line has been formed on the substrate, thereby forming a break in the continuous reinforcement portion and an end of the extruded line formed on the substrate, then lowering the temperature of the filament in the extrusion head below the melting point of the reinforcement portion to enable a further extruded line to be formed on the substrate. Optionally the extrusion head and the substrate are moved apart (by moving one or both of them) after the temperature of the filament in the extrusion head has been raised above the melting point of the reinforcement portion, in order to assist in separating the break in the continuous reinforcement portion from the end of the extruded line. The difference in melting points is typically less than 15° C. and preferably less than 10° C. Having the melting points relatively close together in this way is advantageous because it enables the line to be "cut" by raising the temperature of the filament in the extrusion head by a small amount.

Typically the object is manufactured by forming a plurality of extruded lines on selected parts of the substrate in accordance with a three-dimensional model of the object. The object may manufactured by forming a series of non-planar layers, or by forming series of planar layers each comprising a plurality of extruded lines extending in an X-Y plane formed on selected parts of the substrate in accordance with the three-dimensional model of the object; incrementing the position of the extrusion head and/or the substrate in a Z-direction orthogonal to the X-Y plane; and repeating the process to form a three-dimensional object comprising a series of layers some of which have different shapes and/or sizes to each other.

The melting points of the reinforcement and matrix portions are different, and can be determined by loss of the crystalline phase determined for instance by differential scanning calorimetry and/or dynamic mechanical thermal analysis.

The matrix portion has a melting point which is preferably below 180° C. and most preferably below 170° C.

The reinforcement portion has a melting point which is typically below 200° C., preferably below 180° C. and most preferably below 170° C.

The difference in melting points is preferably greater than 2° C., and most preferably greater than 5° C. Providing such a minimum difference in the melting points ensures that the reinforcement portion is not melted in the extrusion head.

The reinforcement portion and the matrix portion may be formed from the same polymer, optionally with different molecular weights. Forming the reinforcement portion and the matrix portion from the same polymer is preferred because it provides good bonding between them in the filament and in the extruded line, and because it tends to give a small difference in melting points between them, which is advantageous for the reasons given above.

Typically a polymer forming the reinforcement portion has a higher molecular weight than a polymer forming the matrix portion.

The crystallinity of the reinforcement and matrix portions can be determined by differential scanning calorimetry and/or dynamic mechanical thermal analysis. Typically the reinforcement portion has a crystallinity which is greater than 60% by weight, preferably greater than 70% by weight and most preferably greater than 80% by weight. The matrix portion may be completely amorphous but more typically will have a degree of crystallinity. Typically the crystallinity of the matrix portion is less than 50% and preferably it is less than 30% by weight, less than 20% by weight, or most preferably less than 5% by weight.

The difference in average crystallinity by weight between the reinforcement portion and the matrix portion is typically greater than 5%, greater than 10%, greater than 30%, greater than 50%, greater than 70% or most preferably greater than 90%.

The reinforcement portion typically occupies more than 50% and preferably more than 60% of the volume of the filament.

The reinforcement portion typically occupies less than 91% and preferably less than 67% of the volume of the filament.

The filament preferably has a maximum diameter which is less than 2 mm or more preferably less than 1 mm. Such a small maximum diameter makes the filament suitable for use in an additive manufacturing process.

The filament has an average cross-sectional area which is typically less than 3 mm$^2$ and preferably less than 1 mm$^2$.

The reinforcement portion may run parallel with the length of the filament and be at least partially surrounded by the matrix portion. In such a case the matrix portion may be in the form of a sheath with no gaps which completely surrounds the reinforcement portion, or the matrix portion may have gaps—for instance it may comprise a series of fibres running axially or in a helix along the length of the filament. Alternatively the reinforcement portion and the matrix portion may be intertwined with each other so that they both follow tortuous paths, for instance by twisting or some other form of intertwining such as braiding.

The reinforcement portion preferably comprises at least one reinforcement fibre in which more than 50% and preferably more than 80% of the fibre by volume comprises crystals aligned within 1° of being parallel with a length of the fibre. Thus if the reinforcement fibre(s) run parallel with the length of the filament then so will the crystals. Alternatively if the reinforcement fibre(s) follow a tortuous path such as a helix then so will the crystals.

Alignment of the crystals can be measured by X-Ray analysis. In the case of Dyneema® for example, the polymer chains can achieve a parallel orientation of about 95%.

The reinforcement portion may be formed by drawing a polymer under tension to form one or more reinforcement fibres with a majority of the crystals (and their associated polymer chains) aligned within 1° of being parallel with the length of the fibre(s).

Optionally the reinforcement portion may comprise a composite material—for instance a spun fibre drawn from a thermoplastic polymer gel loaded with carbon nanotubes or graphene.

Optionally the reinforcement portion comprises a ferroelectric polymer such as polyvinylidene fluoride.

Optionally the reinforcement portion has a yield strength which is greater than 500 MPa, preferably greater than 1 GPa and most preferably greater than 2 GPa.

Optionally the reinforcement portion comprises a plurality of fibres.

Preferably both the reinforcement portion and the matrix portion are thermoplastic.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
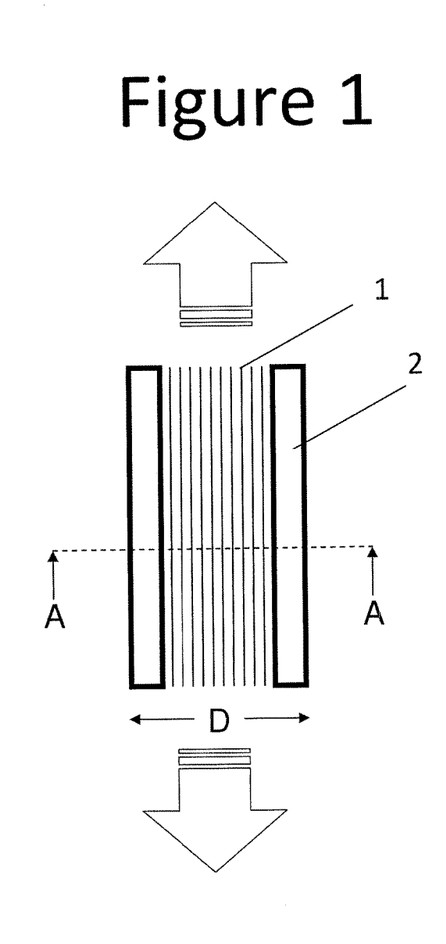
FIG. 1 is a longitudinal cross-sectional view of a filament with the section taken along a line B-B in FIG. 2.
Figure 2:
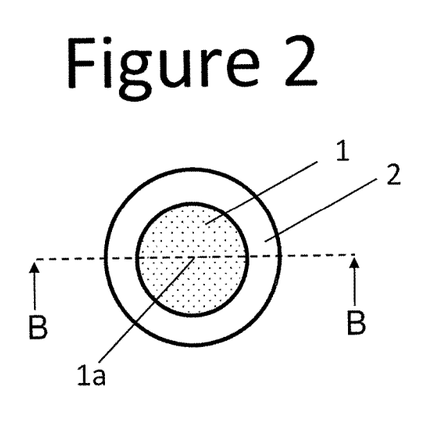
FIG. 2 is a transverse cross-sectional view of the filament with the section taken along a line A-A in FIG. 1.

FIGS. 1 and 2 show a filament for use in an extrusion-based additive manufacturing method according to a first aspect of the invention. The filament comprises a thermoplastic semi-crystalline polymeric reinforcement portion (or core) 1 which occupies a central axis 1a of the filament and is surrounded by a thermoplastic amorphous polymeric matrix portion (or sheath) 2. Both portions 1,2 run continuously along the length of the filament.

The core 1 occupies about 40-60% of the volume of the filament, including the geometric centre 1*a* of the cross-sectional area of the filament, the rest of the volume being occupied by the sheath 2. The filament has a maximum outer diameter D which is less than 2 mm and more preferably less than 1 mm.

The core 1 is manufactured by spinning and drawing a polymer under tension to form one or more reinforcement fibres with crystallites aligned with the length of the fibre(s). The core 1 may consist of a single one of such fibres only, or it may comprise a plurality of such fibres.

The sheath 2 is formed and bonded to the core 1 by the following process. The core 1 is pulled through a heated ring along with a number of amorphous fibres (or tows of fibres). As they are pulled through the heated ring, the amorphous fibres/tows melt and coalesce to form an annular sheath around the core and then cool and solidify to become bonded to the core.

Figure 3:
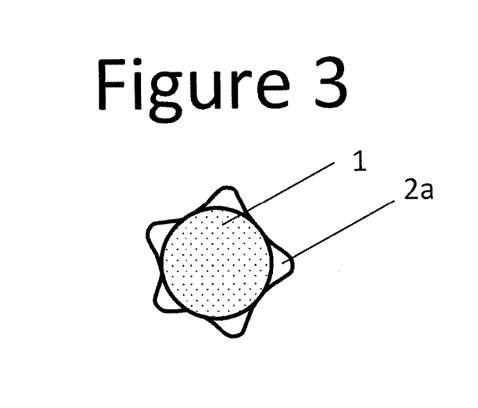
FIG. 3 is a transverse cross-sectional view of an alternative filament.

In the case of FIG. 2 the matrix portion 2 comprises a continuous annular sheath layer with no gaps which completely surrounds the core 1. In the case of FIG. 3 the matrix portion comprises a set of separate axially extending fibres or tows 2*a* separated by gaps. The fibres/tows 2*a* are bonded to the core 1 in a similar manner to the annular sheath 2 but do not coalesce with each other as they pass through the heated ring.

Figure 4:
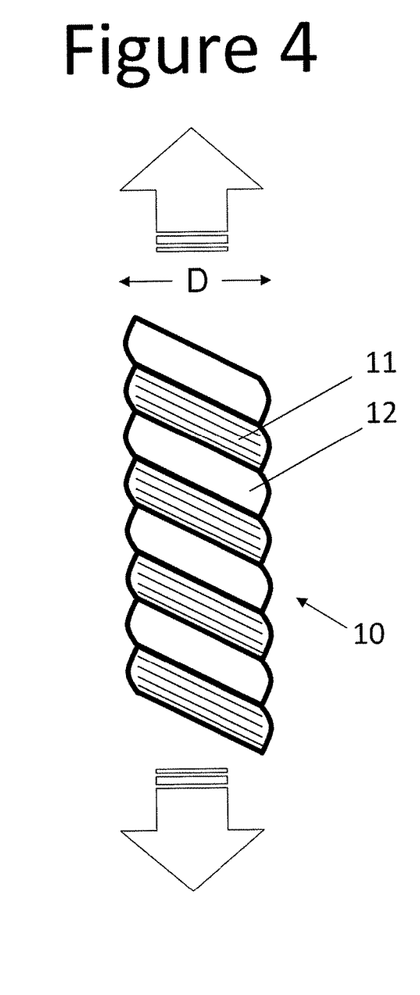
FIG. 4 is a longitudinal cross-sectional view of a twisted filament.

FIG. 4 shows a filament 10 according to a further aspect of the invention. The filament comprises a spun fibre semi-crystalline reinforcement portion 11 which is twisted with a spun fibre amorphous matrix portion 12 so that both fibres 11,12 follow helical paths running continuously along the length of the filament. The fibres 11,12 are twisted by turning a bobbin. The fibres 11,12 may or may not be bonded together.

The portions 11,12 occupies about the same volume of the filament 10. The filament 10 has a maximum outer diameter D which is less than 2 mm and more preferably less than 1 mm.

The polymer chains and crystallites in the reinforcement portion 1,11 are aligned with the length of the fibre(s) which form it. So in the case of FIG. 1 the polymer chains and crystallites are parallel with the length of the filament whereas in FIG. 4 they follow a helical path.

Suitable materials for the reinforcement portion 1,11 are polyethylene (PE), High Density polyethylene (HDPE), Ultra High Density polyethylene (UHDPE), Acrylonitrile butadiene styrene (ABS), Polypropylene (PP), Polydimethyl siloxane (PDMS), Polyoxymethylene (POM), Polyethylene terephthalate (PET), Polyetheretherketone (PEEK), Polyamide (PA), Polysulphone (PS), Polyphenylene sulphide (PPS), Polyphenylsulfone (PPSF), Polytetrafluoroethylene (PTFE), or polyvinylidene fluoride (PVDF).

Dyneema® is one example of a suitable UHDPE fibre which can provide a yield strength greater than 2 GPa and preferably greater than 2.4 GPa, a crystallinity by weight which is greater than 80% and preferably greater than 85%, and has polymer chains with a parallel orientation greater than 90% or more preferably greater than 95%.

The matrix portion 2,2*a*,12 is typically formed from the same polymer as the reinforcement portion 1,11, optionally with different molecular weights. Where the molecular weights are different, then preferably the reinforcement portion has the higher molecular weight (for instance between 2,000,000 and 6,000,000 in the case of UHDPE).

The reinforcement portion 1,11 has a higher crystallinity than the matrix portion 2,2*a*,12. This higher crystallinity results in a higher melting point.

Typically the fibres of the reinforcement portion 1,11 and the matrix portion 2,2*a*,12 are both formed by drawing the fibre under tension from a polymer melt. However the crystallinity of the fibres of the reinforcement portion 1,11 is enhanced compared with the amorphous fibres of the matrix portion 2,2*a*,12 by using a slower cooling rate, a higher drawing rate and/or a polymer with a higher molecular weight.

Figure 5:
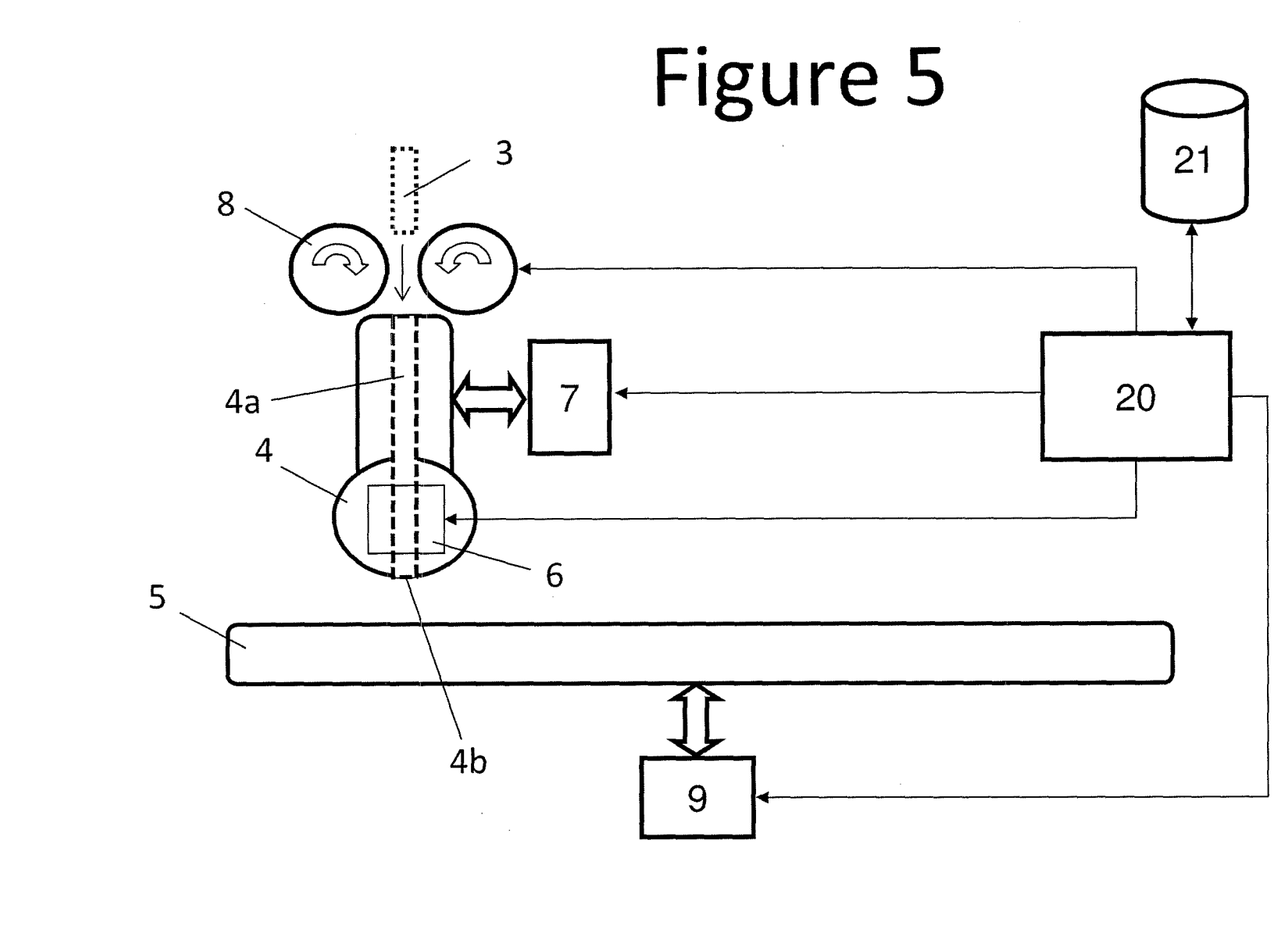
FIG. 5 is a schematic view of apparatus for manufacturing an object by an extrusion-based additive manufacturing method.

Apparatus for manufacturing an object by an extrusion-based additive manufacturing method using a filament 3 similar to those shown in FIGS. 1-4 is shown in FIG. 5. The apparatus comprises an extrusion head 4 having a channel 4*a* with an extrusion outlet 4*b*; a pair of drive wheels 8; a heater 6 arranged to raise the temperature of material within the channel 4*a*; a heated build plate 5; and an XY drive motor 7 arranged to cause relative movement in the XY plane between the extrusion head and the build plate—in this case by moving the extrusion head 4. A Z drive motor 9 can move the build plate 5 up or down in the Z direction as the part is built.

The outlet 4*b* has a maximum diameter greater than 0.1 and less than 1 mm. More preferably the maximum diameter is greater than 0.25 mm and less than 0.5 mm. The outlet 4*b* has a smaller diameter than the filament but a greater diameter than the reinforcement portion.

A controller 20 controls the heater 6, drive wheels 8 and drive motors 7,9 in order to manufacture a part in accordance with a Computer Aided Design (CAD) model of the part in a store 21 by following the process shown in FIGS. 6-10. Note that FIGS. 6-10 omit certain parts of the apparatus of FIG. 5 for purposes of clarity.

Figure 6:
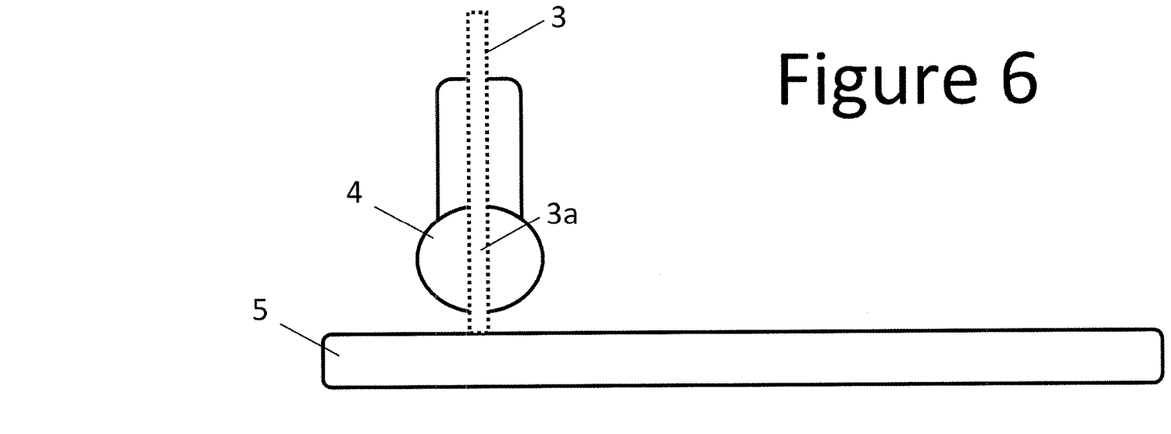
FIGS. 6-10 show an object being manufactured using the apparatus of FIG. 5.
Figure 7:
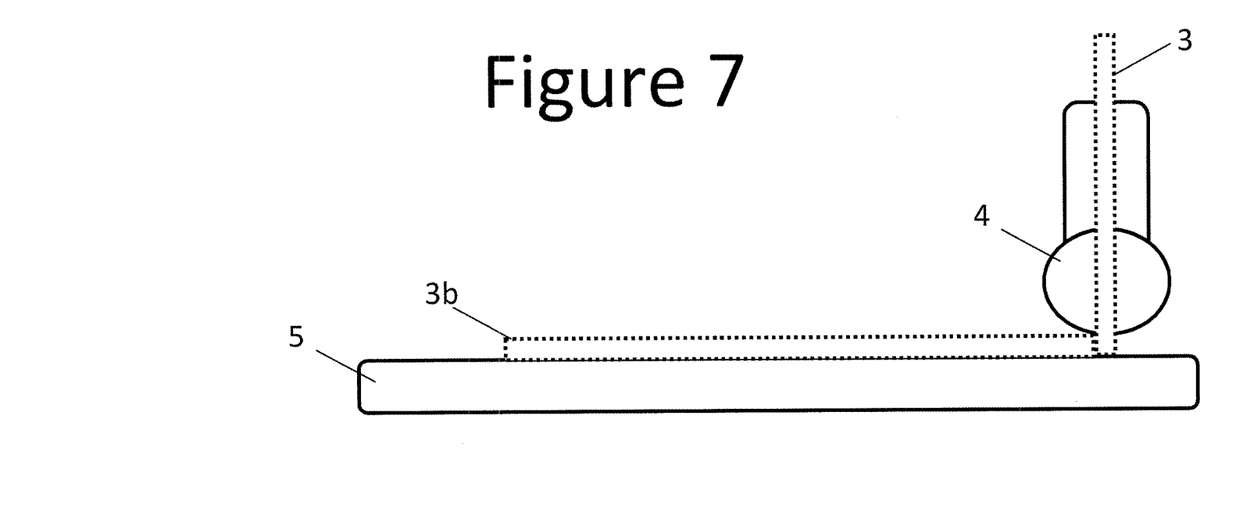

First, the drive wheels 8 are driven to feed the filament 3 through the channel 4*a* and the motors 7,9 are driven to move the extrusion head into a desired position above the build plate 5 as shown in FIG. 6. The heater 6 is operated to raise the temperature of the filament in the extrusion head above the melting point of the matrix portion but below the melting point of the reinforcement portion so that the matrix portion of the filament melts within the extrusion head, thereby forming a partially molten filament 3*a* within the extrusion head. The partially molten filament 3*a* is then extruded from the extrusion head onto the build plate 5 and the XY motor 7 is operated to deposit an extruded line 3*b* as shown in FIG. 7. Only the matrix portion of the filament melts within the extrusion head and the reinforcement portion of the partially molten filament 3*a* remains in a semi-crystalline state as it is extruded from the outlet 4*b* of the extrusion head. The matrix portion of the extruded line 3*b* solidifies when it cools after it has been laid down on the build plate 5.

The relative XY movement between the extrusion head 4 and the build plate 5 is sufficiently fast relative to the feed rate of the drive wheels 8 that the reinforcement portion is in tension as the extruded line 3*b* is deposited. The polymer chains and crystallites in the reinforcement portion are oriented with the extruded line 3*b*—either lying parallel with the length of the extruded line 3*b* in the case of the filament of FIG. 1 or lying in a helix with the axis of the helix lying along the length of the extruded line 3*b* in the case of the filament of FIG. 4.

Figure 8:
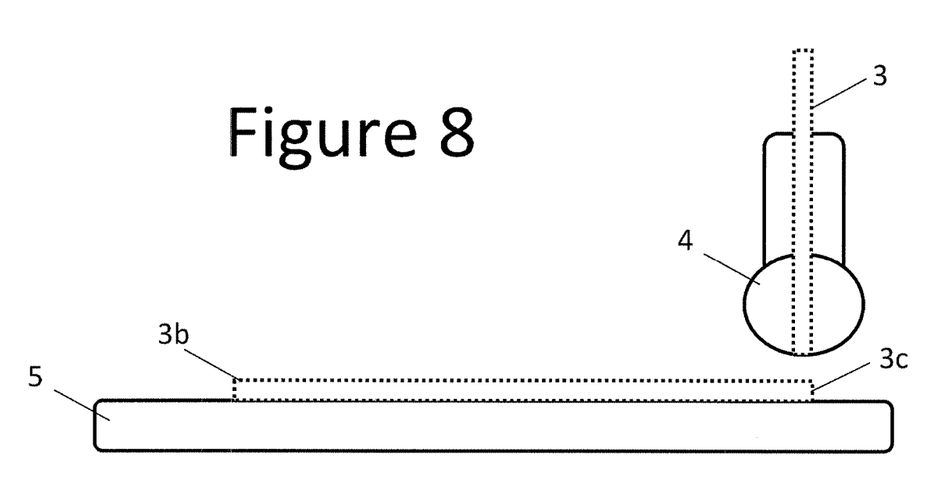

Next, the heater 6 is operated to temporarily raise the temperature of the filament in the extrusion head 4 above the melting point of the reinforcement portion after the extruded line 3*b* has been formed on the substrate, thereby forming a break in the continuous reinforcement portion. At the same time the Z drive motor 9 is operated to lower the build plate 5 and effectively "cut" the filament to form an end 3c of the extruded line as shown in FIG. 8.

Figure 9:
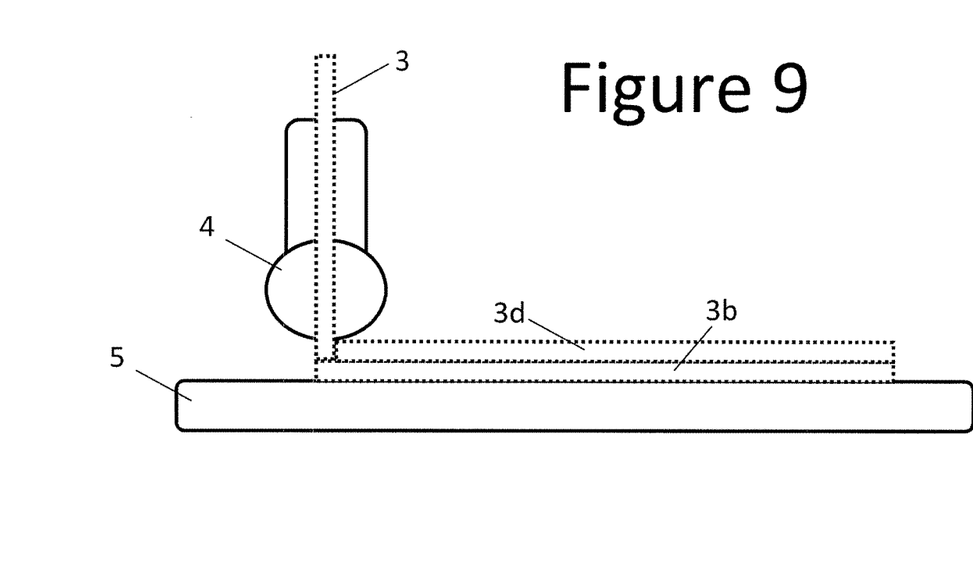

Next, the heater 6 is operated to lower the temperature of the filament in the extrusion head back below the melting point of the reinforcement portion to enable a further extruded line 3d to be formed as shown in FIG. 9. In the case of FIG. 9 the second line 3d is deposited on top of the first line 3b with which it fuses, although it may be formed next to (and fuse with) the line 3b in the same XY plane if required.

Figure 10:
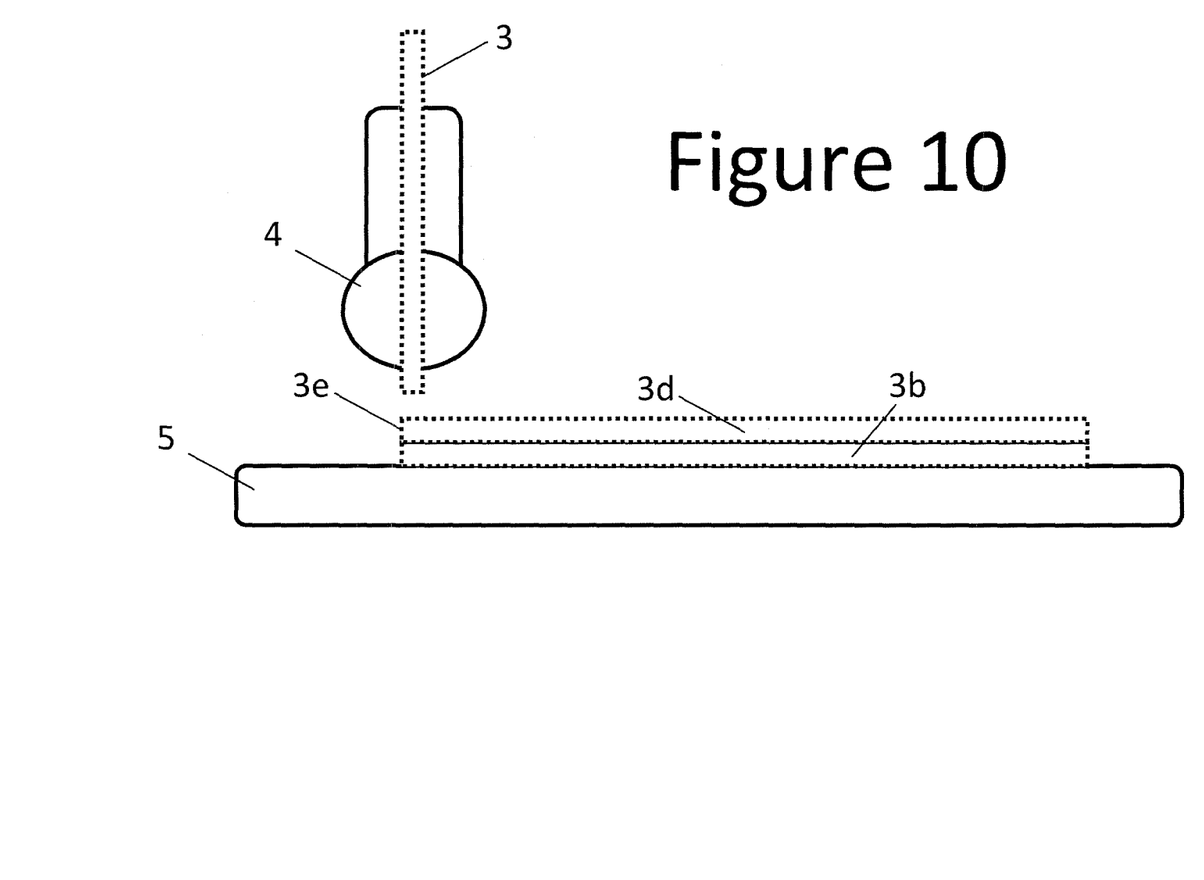

Next, the heater 6 is operated to temporarily raising the temperature of the filament in the extrusion head 4 above the melting point of the reinforcement portion after the extruded line 3d has been formed, thereby forming a break in the continuous reinforcement portion. At the same time the Z drive motor 9 is operated to lower the build plate 5 and effectively "cut" the filament to form an end 3e of the extruded line as shown in FIG. 10.

This process is then repeated a number of times as required to manufacture a part in accordance with the CAD model.

The length of time of the heat pulse which "cuts" the filament at the end of each line will depend on a number of factors, mainly the thermal mass of the extrusion head, but it will typically be of the order of 0.1 to 10 s.

In the case of a filament where the reinforcement portion 1 comprises a collection of fibres with inter-fibre gaps, then as the matrix portion melts in the extrusion head the melted material impregnates these inter-fibre gaps. In such a case the twisted filament of FIG. 4 is preferred due to the more intimate engagement between the reinforcement portion 1 and the matrix portion 2 which makes such impregnation easier.

In the case of a filament where the reinforcement portion 1 comprises a single fibre, then no such impregnation is necessary within the extrusion head. In such a case the filaments of FIGS. 1-3 (in which the reinforcement portion runs parallel with the length of the filament and is at least partially surrounded by the matrix portion) are preferred because they make it more easy for matrix material to flow between and bond together adjacent reinforcement fibres after they have been extruded, filling the gaps between the reinforcement fibres in adjacent extruded lines.

Figure 11:
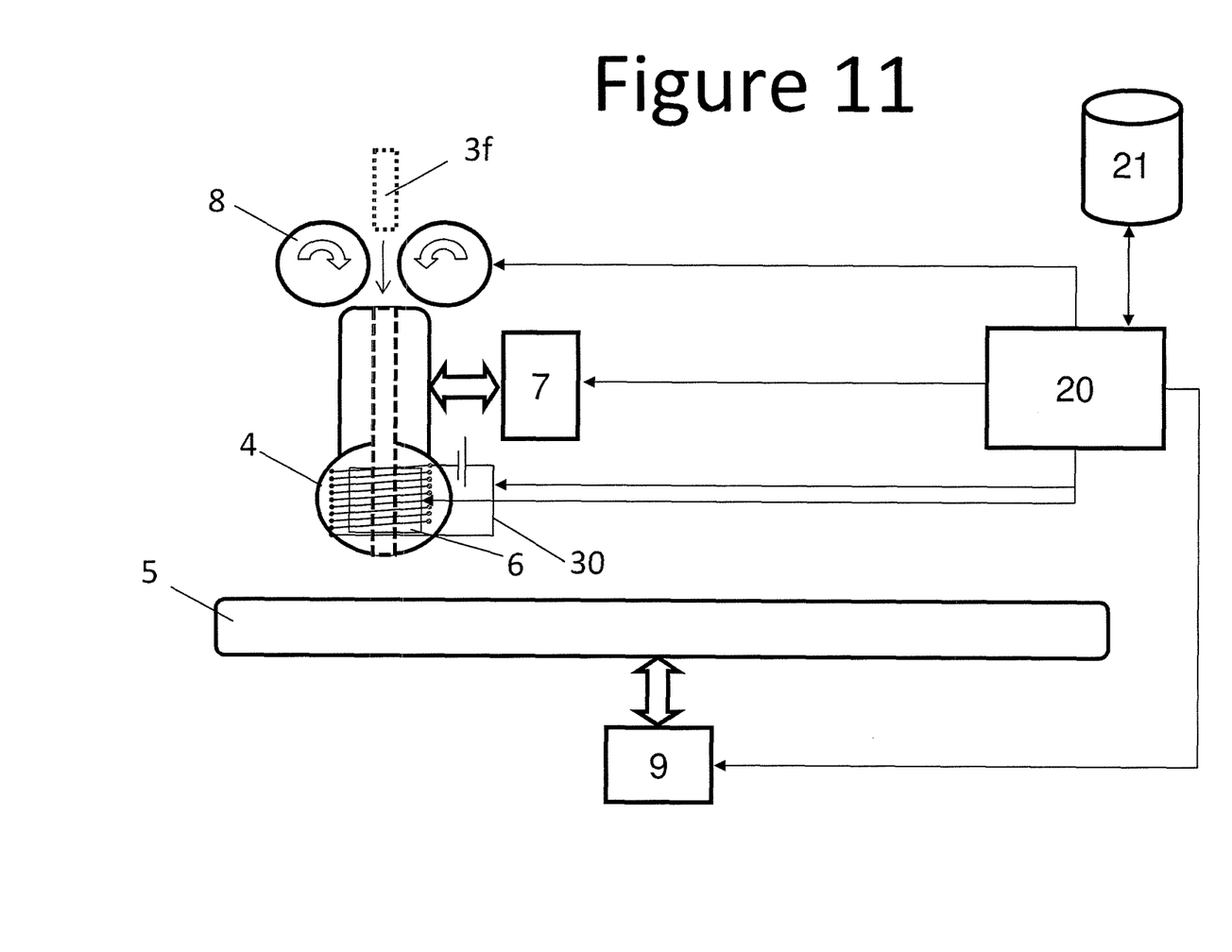
FIG. 11 is a schematic view of alternative apparatus for manufacturing a piezoelectric object by an extrusion-based additive manufacturing method.

Alternative apparatus for manufacturing an object by an extrusion-based additive manufacturing method is shown in FIG. 11. Most components of the apparatus are the same as those shown in FIG. 5 and are given the same reference numbers. A coil of electrically conducting wire 30 surrounds the channel in the extrusion head and can be selectively energized by the controller 20 to apply an electromagnetic field 31 to material within the channel as shown in FIG. 12.

The apparatus of FIG. 11 is used with a filament 3f in which the reinforcement portion comprises a ferroelectric semi-crystalline polymer such as polyvinylidene fluoride and the matrix portion comprises an amorphous (and hence non-ferroelectric) polymer such as polyvinylidene fluoride.

First, the drive wheels 8 are driven to feed the filament 3f through the channel and the motors 7,9 are driven to move the extrusion head into a desired position above the build plate 5. Next, the heater 6 is operated to raise the temperature of the filament in the extrusion head above the melting point of the matrix portion but below the melting point of the reinforcement portion so that the matrix portion of the filament melts within the extrusion head, thereby forming a partially molten filament within the extrusion head. At the same time the coil 30 is energised to apply an electromagnetic field 31 to the filament within the extrusion head. This causes the ferroelectric polymer within the extrusion head to become poled.

Figure 12:
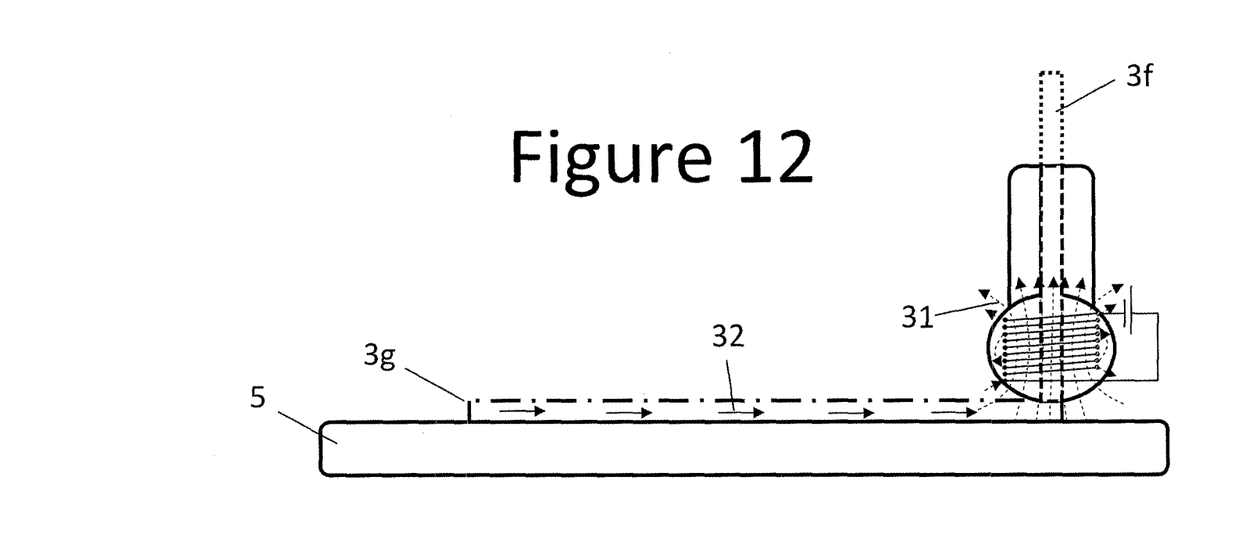
FIG. 12 shows an object being manufactured using the apparatus of FIG. 11.

The partially molten filament is then extruded from the extrusion head onto the build plate 5 and the XY motor 7 is operated to deposit an extruded line 3g as shown in FIG. 12 in which the ferroelectric polymer is poled as indicated schematically by arrows 32. The rest of the process is identical to the process described above with reference to FIGS. 6-10.

Leaving the crystal structure of the reinforcement portion intact and under tension whilst being poled by the coil 30 enables the extruded line to have ferroelectric properties.

Figure 13:
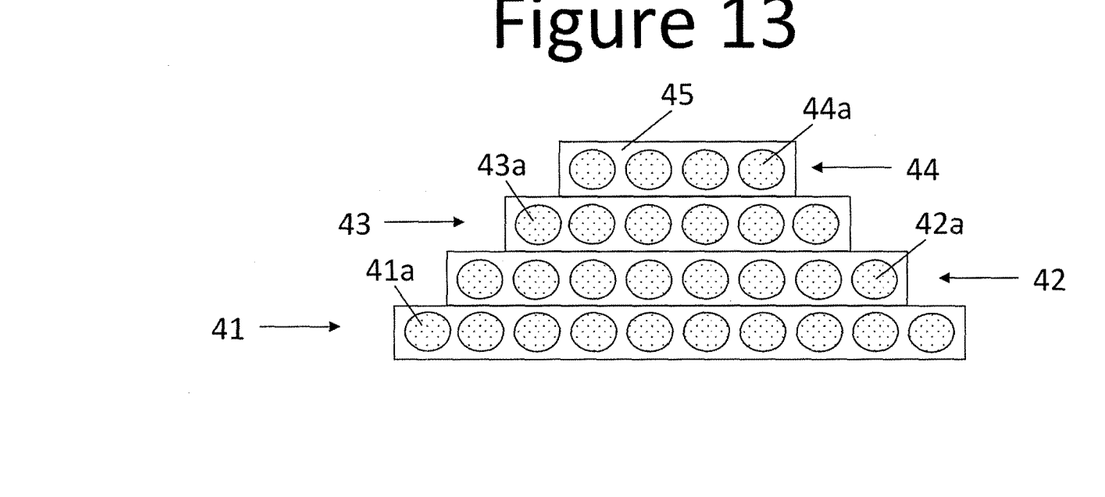
FIG. 13 is a sectional view of an object manufactured by the method of FIGS. 6-10 viewed in section transverse to the extruded lines.

An object manufactured by the method of FIGS. 6-10 is shown in cross-section in FIG. 13, the section being taken transverse to the length of the extruded lines. The object comprising a stack of four layers 41-44 each containing a plurality of extruded lines. Each extruded line comprises a semi-crystalline polymeric reinforcement portion 41a,42a etc and a solid thermoplastic polymeric matrix portion surrounding the reinforcement portion. Each reinforcement portion 41a,42a etc. runs continuously along the length of a respective one of the extruded lines and has a higher melting point and a higher crystallinity than its respective matrix portion. The matrix portions of the extruded lines are fused together to form a matrix phase 45 which extends continuously throughout the object and bonds together the reinforcement portions. Each layer 41-44 has a different number of extruded lines.

In the example of FIG. 13 all lines in all layers are parallel, but in an alternative embodiment (not shown) the lines may extend in different directions in the manner of a composite layup with some layers oriented with their lines at 0°, others at +/−45° and others at 90°.

Figure 14:
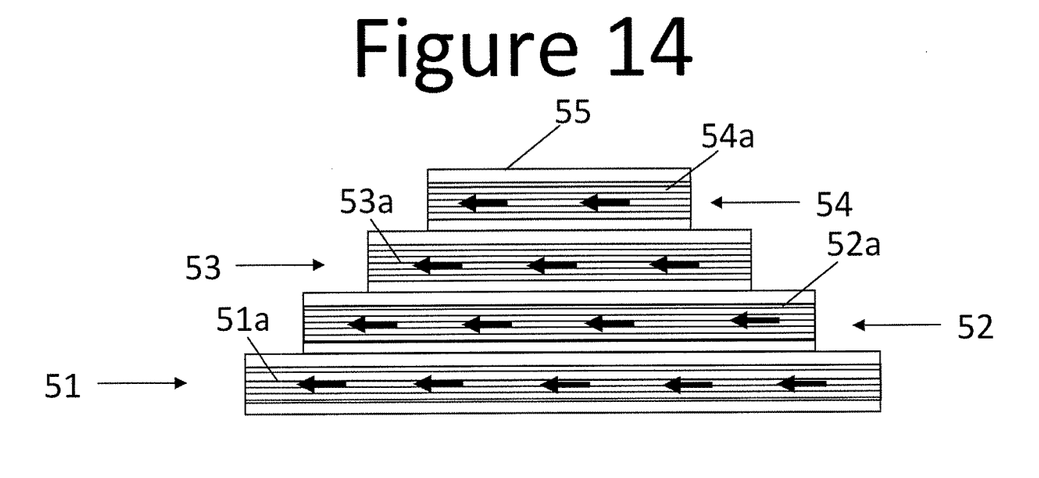
FIG. 14 shows a uniformly poled object manufactured by the method of FIG. 12 viewed in section along the length of the extruded lines.

An object manufactured by the method of FIG. 12 is shown in cross-section in FIG. 14, the section being taken in this case along the length of the extruded lines. The object comprising a stack of four layers 51-54 each containing a plurality of extruded lines. Each extruded line comprises a semi-crystalline polymeric reinforcement portion 51a,52a etc and a solid thermoplastic polymeric matrix portion surrounding the reinforcement portion. Each reinforcement portion runs continuously along the length of a respective one of the extruded lines. The matrix portions of the extruded lines are fused together to form a matrix phase 55 which extends continuously throughout the object and bonds together the reinforcement portions. The lengths of the extruded lines differ between the layers.

In the case of FIG. 14 the coil 30 has been energized permanently during manufacture of the part, with the direction of current in the coil alternating between lines so that the object is poled uniformly, that is with all parallel lines being poled in the same direction.

Figure 15:
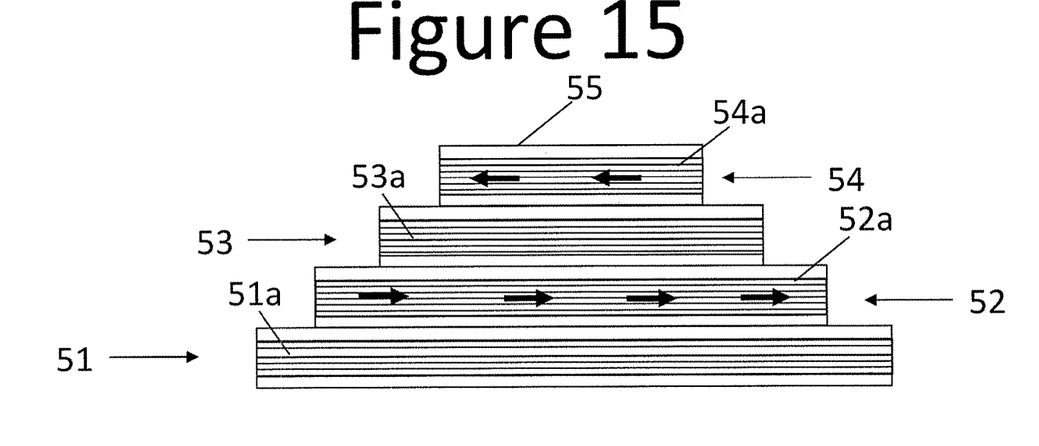
FIG. 15 shows a non-uniformly poled object manufactured by the method of FIG. 12 viewed in section along the length of the extruded lines.

FIG. 15 shows an alternative in which the coil 30 has been turned on and off to pole some layers but not others. In the example of FIG. 15 the part has a number of poled layers 52,54 interleaved with un-poled layers 51,53. Also the layers 52,54 are oriented with their lines extending parallel with each other but poled in opposite directions.

Although the invention has been described above with reference to one or more preferred embodiments, it will be appreciated that various changes or modifications may be made without departing from the scope of the invention as defined in the appended claims.

The invention claimed is:

1. A method of manufacturing an object, the method comprising:
   feeding a filament to an extrusion head, the filament comprising a semi-crystalline polymeric reinforcement portion and a polymeric matrix portion which both run continuously along a length of the filament, wherein the reinforcement portion has a higher melting point and a higher crystallinity than the matrix portion;
   raising the temperature of the filament in the extrusion head above the melting point of the matrix portion but below the melting point of the reinforcement portion so that the matrix portion of the filament melts within the extrusion head, thereby forming a partially molten filament within the extrusion head;
   extruding the partially molten filament from the extrusion head onto a substrate, the reinforcement portion of the partially molten filament remaining in a semi-crystalline state as it is extruded from the extrusion head;
   causing relative movement between the extrusion head and the substrate as the partially molten filament is extruded onto the substrate in order to form an extruded line on the substrate, wherein the matrix portion of the extruded line solidifies after the extruded line has been deposited on the substrate; and
   temporarily raising the temperature of the filament in the extrusion head above the melting point of the reinforcement portion after the extruded line has been formed on the substrate, thereby forming a break in the continuous reinforcement portion and an end of the extruded line formed on the substrate, then lowering the temperature of the filament in the extrusion head below the melting point of the reinforcement portion to enable a further extruded line to be deposited on the substrate.

2. A method of manufacturing an object, the method comprising:
   feeding a filament to an extrusion head, the filament comprising a semi-crystalline polymeric reinforcement portion and a polymeric matrix portion which both run continuously along a length of the filament, wherein the reinforcement portion has a higher melting point and a higher crystallinity than the matrix portion;
   raising the temperature of the filament in the extrusion head above the melting point of the matrix portion but below the melting point of the reinforcement portion so that the matrix portion of the filament melts within the extrusion head, thereby forming a partially molten filament within the extrusion head;
   extruding the partially molten filament from the extrusion head onto a substrate, the reinforcement portion of the partially molten filament remaining in a semi-crystalline state as it is extruded from the extrusion head;
   causing relative movement between the extrusion head and the substrate as the partially molten filament is extruded onto the substrate in order to form an extruded line on the substrate, wherein the matrix portion of the extruded line solidifies after the extruded line has been deposited on the substrate; and
   applying an electromagnetic field to the filament before it is extruded onto the substrate, thereby poling the reinforcement portion.

3. A method of manufacturing an object, the method comprising:
   feeding a filament to an extrusion head, the filament comprising a semi-crystalline polymeric reinforcement portion and a polymeric matrix portion which both run continuously along a length of the filament, wherein the reinforcement portion has a higher melting point and a higher crystallinity than the matrix portion;
   raising the temperature of the filament in the extrusion head above the melting point of the matrix portion but below the melting point of the reinforcement portion so that the matrix portion of the filament melts within the extrusion head, thereby forming a partially molten filament within the extrusion head;
   extruding the partially molten filament from the extrusion head onto a substrate, the reinforcement portion of the partially molten filament remaining in a semi-crystalline state as it is extruded from the extrusion head;
   causing relative movement between the extrusion head and the substrate as the partially molten filament is extruded onto the substrate in order to form an extruded line on the substrate, wherein the matrix portion of the extruded line solidifies after the extruded line has been deposited on the substrate;
   applying an electromagnetic field to the filament before it is extruded onto the substrate, thereby poling the reinforcement portion; and
   wherein the electromagnetic field is applied to the filament within the extrusion head before and/or after it has been partially melted.

4. The method of claim 1 wherein the relative movement between the extrusion head and the substrate is sufficiently fast that the reinforcement portion is in tension as the extruded line is deposited on the substrate.

5. The method of claim 1 wherein the object is manufactured by depositing a plurality of extruded lines on selected parts of the substrate in a series of layers in accordance with a three-dimensional model of the object.

* * * * *